United States Patent [19]

Grodzka et al.

[11] 4,374,655
[45] Feb. 22, 1983

[54] HUMIDITY CONTROLLER

[75] Inventors: Philomena Grodzka, Huntsville; Paul O. McCormick, Athens; James W. Fletcher, Huntsville, all of Ala.

[73] Assignee: Lockheed Missiles & Space Company, Inc., Sunnyvale, Calif.

[21] Appl. No.: 327,895

[22] Filed: Dec. 7, 1981

[51] Int. Cl.³ ............................................ B01D 53/04
[52] U.S. Cl. ...................................... 55/163; 55/208; 55/387
[58] Field of Search ............... 55/31, 33, 35, 74, 160, 55/161, 163, 208, 217, 387

[56] References Cited

U.S. PATENT DOCUMENTS

| | | | |
|---|---|---|---|
| 2,336,456 | 12/1943 | Anderegg | 55/208 |
| 2,462,952 | 3/1949 | Dunkak | 55/208 |
| 2,511,666 | 6/1950 | Barr | 55/161 |
| 2,517,537 | 8/1950 | Anderegg | 55/33 X |
| 2,569,537 | 10/1951 | Robbins | 55/163 X |
| 2,601,905 | 7/1952 | Anderegg | 55/208 X |
| 2,604,760 | 7/1952 | Southern | 55/208 X |
| 2,717,050 | 9/1955 | Ames | 55/163 |
| 3,271,089 | 9/1966 | Krellen | 55/387 X |
| 3,320,724 | 5/1967 | Rice | 55/33 X |
| 4,242,112 | 12/1980 | Jebens | 55/208 X |

Primary Examiner—Robert H. Spitzer
Attorney, Agent, or Firm—John J. Morrissey

[57] ABSTRACT

A humidity controller (12) for an outdoor storage container (10) is installed with a clearance fit in an apertured portion of a vertical wall (11) of the container (10). The humidity controller (12) comprises a frame assembly (13) to which a bed of solid desiccant material (14) and a transparent cover (15) are secured. Solar energy incident upon the transparent cover (15) is transmitted into a passageway between the bed of desiccant material (14) and the transparent cover (15), thereby heating air in the passageway and also heating a surface of the bed of desiccant material (14) exposed to the air in the passageway. Moisture adsorbed on bed of desiccant material (14) is vaporized by the solar energy, thereby establishing a concentration gradient for moisture in the bed of desiccant material (14) such that moisture is drawn toward the passageway for vaporization. Lower and upper valves 25 and 26, respectively, provide a natural convection current whereby cooler ambient air is drawn into the passageway and the solar heated moisture-laden air in the passageway is passed to the environment outside the container (10).

16 Claims, 4 Drawing Figures

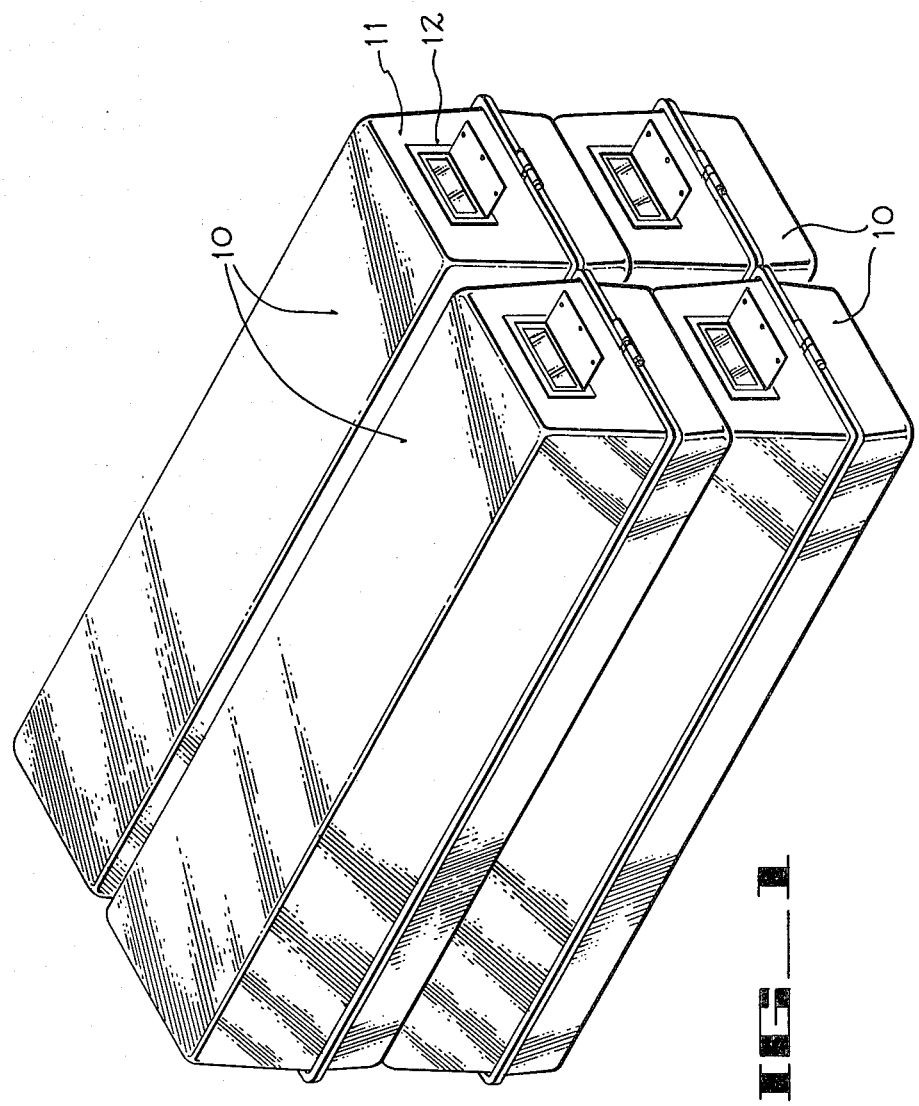

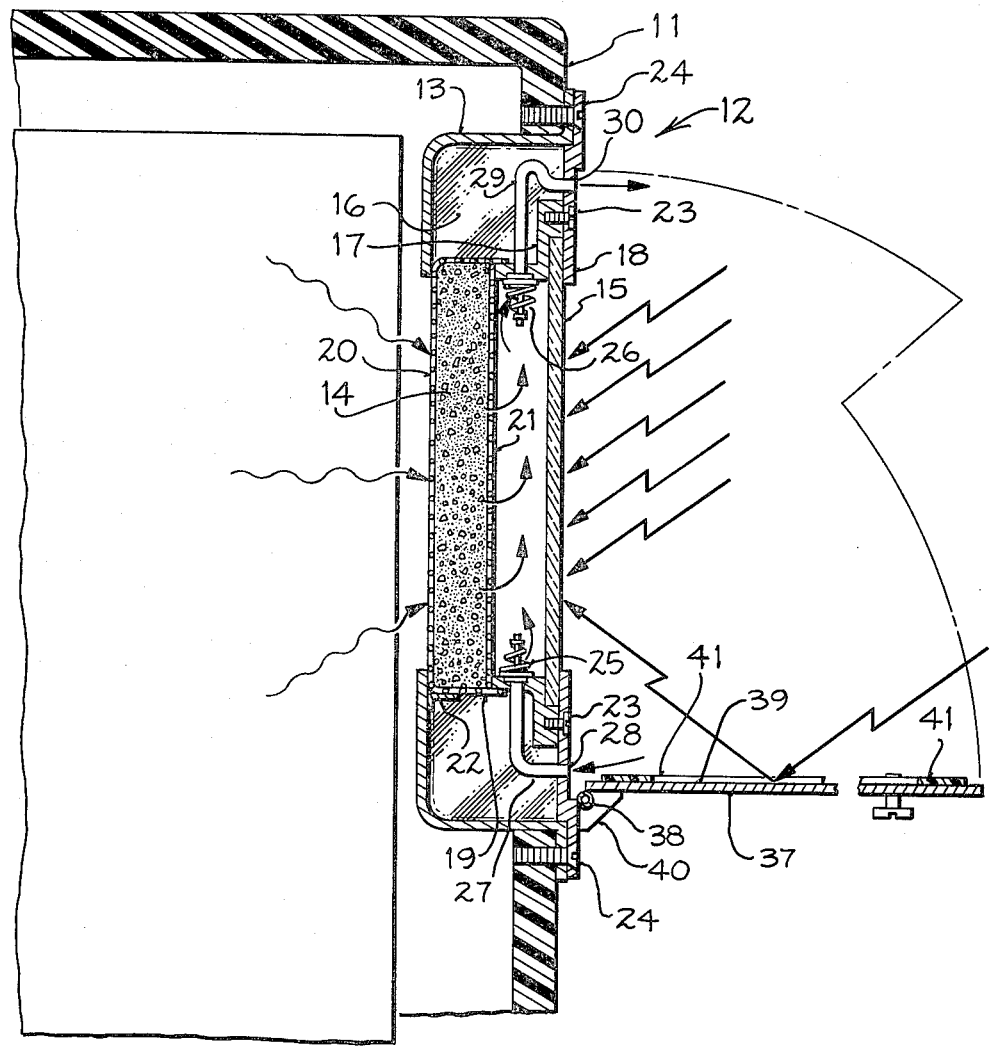
FIG_2
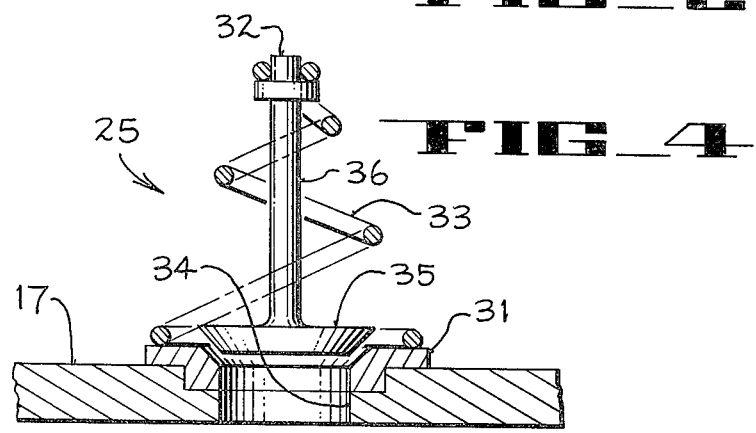
FIG_4

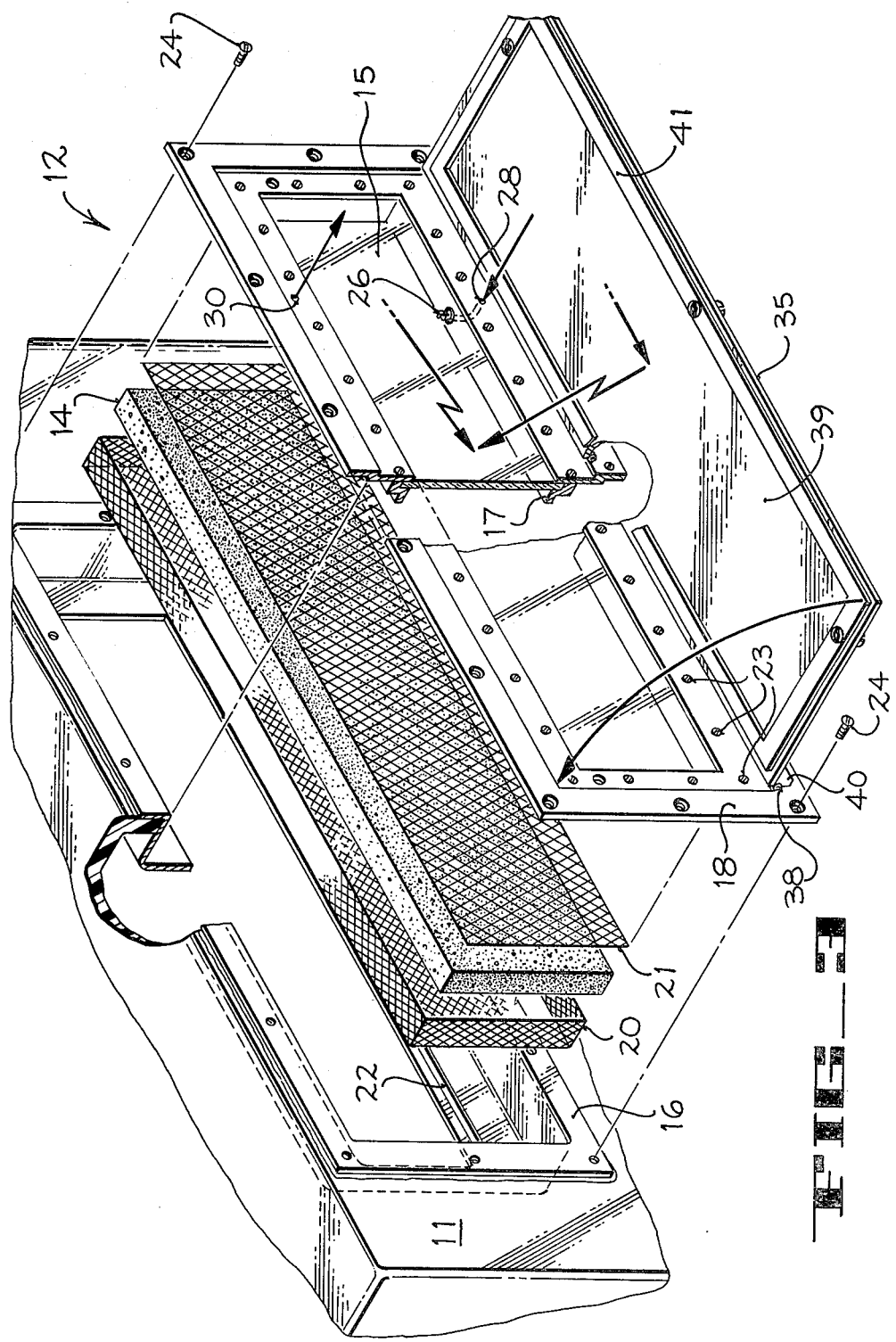
FIG_3

– 4,374,655 –

HUMIDITY CONTROLLER

TECHNICAL FIELD

This invention relates generally to humidity controllers, and more particularly to passive solar-powered humidity controllers for outdoor storage containers.

BACKGROUND ART

Long-term outdoor storage of equipment and materials that are subject to damage from corrosion and/or mildew is often necessary in, for example, the construction and mining industries. Also, household and commercial goods are frequently stored outdoors in containers for long periods of time in areas where there is a shortage of warehouse space. The military services must also stockpile equipment and material in outdoor depots for long periods of time. Such storage often occurs in sealed plastic containers. However, regardless of the material of construction, outdoor storage containers are not completely impervious to moisture due principally to leaks around seals and "breathing" as a result of heating/cooling cycles. Consequently, it is usual to seal a solid desiccant material such as silica gel inside an outdoor storage container to adsorb any moisture that might infiltrate through the walls of the container.

Solid desiccants work quite satisfactorily in protecting the contents of outdoor storage containers from the adverse effects of moisture infiltrating the container walls. It was necessary in the prior art, however, to remove solid desiccants from storage containers periodically for "regeneration," i.e., for processing to restore the water-adsorbing capability of the desiccant material. The process of regenerating desiccant material was energy intensive, requiring approximately 2500 Btu to remove a pound of water (or 5815 joules per gram). Furthermore, many manhours were required in the prior art for inspecting, removing, regenerating and reinstalling solid desiccant materials in outdoor storage containers.

A need has long existed for a technique that would enable solid desiccant materials in outdoor storage containers to be automatically regenerated, preferably by passive solar means, without requiring removal of the desiccant materials from the storage containers.

DISCLOSURE OF INVENTION

It is an object of the present invention to provide a permanently installed humidity controller for a sealed storage container. A humidity controller in accordance with this invention comprises a bed of solid desiccant material that can be regenerated without being removed from the container.

It is also an object of the present invention to provide a humidity controller that can be retrofitted into an existing storage container without having to remove the container from its site, and without substantially reducing the volume available for storage within the container. The retrofitted humidity controller comprises a bed of solid desiccant material, which is permanently installed within the storage container, and which can be passively regenerated by solar energy.

It is likewise an object of the present invention to provide an outdoor storage container having an integrally fitted humidity controller comprising a bed of solid desiccant material and means for passively regenerating the desiccant material by solar energy. The desiccant material, which may be silica gel, adsorbs moisture that infiltrates the container. A frame assembly positioned in an aperture in a vertical wall of the storage container supports the bed of desiccant material inside the container. The aperture is closed by a cover made of an optically transparent material such as clear glass, which is also supported by the frame assembly. The transparent cover is positioned by the frame assembly apart from the bed of desiccant material in order to provide a vertically extending air passageway between the transparent cover and the bed of desiccant material. Solar energy transmitted through the transparent cover heats the air in the passageway, and also heats moisture adsorbed on an exterior surface of the bed of desiccant material exposed to the air in the passgeway.

In accordance with the present invention, solar heating eventually causes adsorbed liquid-phase moisture to evaporate from the exterior surface of the bed of desiccant material and to enter the air passageway in vapor phase, thereby creating a concentration gradient for liquid-phase moisture in the bed of desiccant material. This concentration gradient causes moisture to migrate through the bed of desiccant material toward the exterior surface exposed to the air in the passageway. Solar heating of the air in the passageway raises the temperature of the air in the passageway, thereby increasing the moisture-carrying capability of the air in the passageway.

An entry valve and an exit valve are mounted at different vertical positions on the frame assembly to permit communication between the passageway and the atmosphere outside the storage container. The entry and exit valves are preferably bimetallic valves that open and close in response to changes in temperature, and are pre-set to open whenever the temperature of the solar-heated air in the passageway exceeds the temperature of the ambient atmospheric air outside the storage container by a predetermined amount. In this way, natural convection causes warmer moisture-laden air in the passageway to exit continuously through the vertically higher exit valve as cooler ambient air is admitted into the passageway through the vertically lower entry valve. In effect, the convective flow of air through the passageway continuously flushes evaporated moisture from the passageway.

Commercially available bimetallic valves can be reliably used to provide open communication between the air passageway and the atmosphere outside the storage container whenever the temperature difference between the heated air in the passageway and the cooler ambient atmospheric air equals or exceeds a selected value, and to isolate the air passageway from the atmosphere outside the container whenever the temperature difference is less than the selected value. Whenever solar heating does not occur, i.e., at night or when the sun is obscured by clouds, the passageway between the transparent cover and the bed of desiccant material remains closed to prevent ambient air from entering the passageway. In this way, moisture in the ambient air is prevented from being adsorbed into the bed of desiccant material.

In a preferred embodiment of the invention, a protective lid is hingedly attached to the frame assembly adjacent the transparent cover that seals the aperture in the container wall. The protective lid can be moved from a closed position overlying the transparent cover to an open position at which solar energy can be transmitted through the transparent cover. In closed position, the lid can protect the transparent cover from damage during transportation of the storage container or during violent weather. The inner surface of the lid is lined or coated with a reflective material so that the lid in open position can reflect solar energy onto the transparent cover, thereby increasing the flux of solar energy transmitted through the cover.

A humidity controller according to the present invention can be installed in a loaded storage container on site by cutting an aperture to appropriate size in a vertical wall of the container that is ordinarily exposed to sunlight for at least a part of each day. The frame assembly, which supports the bed of desiccant material and the transparent cover, is then attached to the wall circumjacent the aperture, so that the bed of desiccant material is positioned inside the container and so that the transparent cover seals the aperture. Preferably, the bed of desiccant material is positioned in a generally vertical orientation adjacent the aperture in the container wall, and extends only slightly into the interior of the container. The bed of desiccant material would ordinarily occupy no more volume inside a storage container fitted with a humidity controller according to the present invention than in the prior art.

The transparent cover of a humidity controller according to the present invention is ordinarily planar, and is positioned in the aperture flush with the vertical wall of the container. However, for particular applications, the transparent cover could have a bubble-shaped or other nonplanar configuration and could extend outside the container. Regardless of the configuration and positioning of the transparent cover and the bed of desiccant material, it is a characteristic of the present invention that the transparent cover overlies the aperture in the vertical wall and is spaced apart from the bed of desiccant material to provide a convective air passage between the transparent cover and the bed of desiccant material.

The only moving parts necessary to the operation of a humidity controller according to the present invention are the bimetallic entry and exit valves, which are conventional items of proven reliability and longevity. The entry and exit valves can be positioned on the frame assembly for easy removal and replacement in the relatively rare event of malfunction. If natural convection should ever fail for any reason to remove moisture-laden air from the passageway between the bed of desiccant material and the transparent cover of a particular solar-powered humidity controller unit installed on a particular storage container at a storage site, condensation would form on the inner surface of the transparent cover. The appearance of such condensation would be readily visible upon inspection of the cover, and would provide a positive indication of failure of the particular humidity controller unit. The defective unit could then be removed, and a properly functioning humidity controller unit could be quickly installed in its place without significantly disturbing the contents of the storage container. Repair of the defective unit could be postponed until a convenient time, and could be done away from the storage site.

A detailed specification for a particular embodiment of the present invention is described below with reference to the accompanying drawing. The specification and drawing set forth the best mode presently contemplated by the inventors for carrying out the invention.

BRIEF DESCRIPTION OF THE DRAWING

FIG. 1 is a perspective view of a particular arrangement of storage containers in accordance with the present invention.

FIG. 2 is a cross-sectional view of a humidity controller in accordance with the present invention.

FIG. 3 is a perspective view, partially exploded, of the humidity controller shown in FIG. 2.

FIG. 4 is an enlarged cross-sectional view of the bimetallic valve of FIG. 2.

BEST MODE OF CARRYING OUT THE INVENTION

Sealed storage containers are disposed in a variety of arrangements at outdoor storage sites. In FIG. 1, four storage containers 10, which are representative of an unspecified number of storage containers in accordance with the present invention, are shown in a stacked arrangement. A characteristic feature of a storage container 10 of the present invention is a generally vertical wall 11 having an apertured portion in which a solar-powered humidity controller 12 is installed. In a typical storage container 10, the walls (including the vertical wall 11) are made of a plastic material, although the invention does not depend on the type of material from which the container 10 is made.

The humidity controller 12 of the present invention, as shown in cross-sectional detail in FIG. 2, comprises a frame assembly 13 to which a bed of solid desiccant material 14 and a transparent cover 15 are mechanically secured. The desiccant material preferably comprises silica gel, and the transparent cover 15 is preferably made of clear glass. The frame assembly 13 is of generally box-like configuration, and the aperture in the vertical wall 11 of the container 10 is dimensioned to enable the frame assembly 13 to be positioned with a clearance fit in the aperture. The weight and size of the humidity controller 12 are such as to enable the wall 11 of the container 10 to support the humidity controller 12.

The frame assembly 13 comprises a casing 16, a spacer 17 and a retainer 18. The casing 16 may be viewed as an uncovered receptacle member of the box-like frame assembly 13. The retainer 18 may be viewed as a frame for the transparent cover 15, which functions as a cover for the receptacle-like casing 16. The spacer 17 is mounted between the casing 16 and the retainer 18, and secures the bed of desiccant material 14 and the transparent cover 15 in proper position with respect to each other within the humidity controller 12.

When the humidity controller 12 is to be installed in the container 10, it is convenient first to fit the receptacle-like casing 16 into the aperture in the vertical wall 11 of the container 10. The casing 16, when positioned in the container wall aperture, thereupon presents an endwall toward the interior of the container 10, and presents sidewalls extending from the casing endwall outwardly toward the container wall 11. The interiorly disposed endwall of the casing 16 has an aperture, which is generally aligned with the aperture in the container wall 11 when the casing 16 is fitted in place. Flange portions extend vertically from the sidewalls of the casing 16 to overlap edge portions of the container wall 11 circumjacent the aperture in the wall 11. The flange portions of the casing 16 limit the extent to which the humidity controller 12 can protrude into the interior of the container 10. A gasket or sealant is interposed between the flange portions of the casing 16 and the underlying edge portions around the aperture in the wall 11, thereby providing a substantially air-tight fit between the casing 16 and the wall 11.

After the casing 16 has been fitted in place, the bed of desiccant material 14 is then positioned within the receptacle-like casing 16 adjacent the aperture in the endwall of the casing 16. The bed of desiccant material 14 preferably comprises a quantity of silica gel contained within a fabric sack that is pervious to moisture. The quantity of desiccant material used and the area of the aperture exposing the desiccant material to solar energy depend upon the size of the storage container 10 and upon the severity of the humidity usually experienced at the storage site. The sack of silica gel, or whatever other substance is used for the desiccant material, is enclosed within a housing 19, which gives rigidity to the bed of desiccant material 14.

The housing 19 is a box-like structure, preferably made of metal, comprising a receptacle member 20 and a closure member 21, as shown separated from each other in the exploded view of FIG. 3. The closure member 21, when positioned in place on the receptacle member 20, presses the sack of desiccant material into the receptacle member 20 so that sidewalls of the receptacle member 20 protrude outwardly past the closure member 21 toward the aperture in the container wall 11. In the preferred embodiment, a ledge 22 is attached as by brazing to the endwall of the casing 16 beneath the endwall aperture. The ledge 22 serves as a positioning guide and support for the housing 19. The closure member 21 and an opposing endwall of the receptacle member 20 are foraminous to permit moisture to pass therethrough into and out of the bed of desiccant material 14.

The spacer 17 is a frame-like structure with sidewalls dimensioned for insertion with a clearance fit within the outwardly protruding side-walls of the receptacle member 20. When the spacer 17 is fitted in place in the frame assembly 13, end portions of the spacer sidewalls abut against the closure member 21. Projecting vertically from the sidewalls of the spacer 17 are cover holding portions configured to receive peripheral portions of the transparent cover 15. The cover holding portions of the spacer 17 are configured with recessed surfaces against which inwardly facing peripheral portions of the transparent cover 15 abut, and with rim surfaces against which edge portions of the transparent cover 15 abut.

A primary function of the spacer 17 is to separate the transparent cover 15 from the bed of desiccant material 14, thereby providing an air passageway therebetween. The bed of desiccant material 14 in its foraminous housing 19 is positioned in alignment with the aperture in the endwall of the casing 16 and in alignment with the transparent cover 15 closing the aperture in the container wall 11. The configurations of the apertures in the casing endwall and in the container wall 11 are not critical, but are preferably rectangular for convenience in manufacturing the frame assembly 13, the housing 19 for the bed of desiccant material 14, and the transparent cover 15.

The retainer 18 is a frame-like structure, which when fitted in place in the frame assembly 13 bears against the cover holding portions of the spacer 17 and overlaps outwardly facing peripheral portions of the transparent cover 15. The retainer 18 thereby secures the transparent cover 15 in alignment with the bed of desiccant material 14. The retainer 18, when fitted in place, also bears against the flange portions of the casing 16.

Screws 23 are used to attach the retainer 18 to the spacer 17 circumjacent the periphery of the transparent cover 15. A gasket may be interposed between the retainer 18 and the spacer 17 to provide a substantially air-tight attachment. A sealant such as silicon rubber may be interposed between the peripheral portions of the transparent cover 15 and the overlapping portions of the retainer 18 and the spacer 17 to provide a substantially air-tight seating of the transparent cover 15 in the humidity controller 12. Screws 24 are used to secure the retainer 18 and the flange portions of the casing 16 to the edge portions of the container wall 11 circumjacent the aperture in the wall 11. A gasket may be interposed between the retainer 18 and the flange portions of the casing 16 to provide substantially air-tight contact therebetween.

The passageway between the bed of desiccant material 14 and the transparent cover 15 can be in communication with or isolated from the atmosphere outside the storage container 10 by means of an entry valve 25 and an exit valve 26 mounted in the spacer 17. The entry valve 25 is mounted on a lower wall and the exit valve 26 is mounted on a higher wall of the spacer sidewalls. An entry conduit 27 extending from an entry orifice 28 in the retainer 18 to the entry valve 25 provides a pathway by which cooler ambient air from outside the container 10 can enter the passageway between the bed of desiccant material 14 and the transparent cover 15 when the entry valve 25 is open. Similarly, an exit conduit 29 extending from the exit valve 26 to an exit orifice 30 in the retainer 18 provides a pathway by which heated air in the passageway can pass into the atmosphere outside the container 10 when the exit valve 26 is open. The entry valve 25 and the exit valve 26 are bimetallic valves, and are both pre-set to open whenever the temperature of the air in the passageway exceeds the temperature of the ambient air outside the container 10 by a predetermined amount, e.g., 25 degrees C.

As shown in FIG. 4, the entry valve 25 comprises an annular seat 31, a poppet-shaped stem 32, and a spring 33 configured as a conical helix. The valve seat 31 is secured to the lower sidewall of the spacer 17 circumjacent a bore 34 therethrough. The bore 34 receives the entry conduit 27, which enables cooler ambient air to enter the passageway between the bed of desiccant material 14 and the transparent cover 15 when the central opening in the annular valve seat 31 is unobstructed. The exit valve 26 is preferably identical to the entry valve 25 in construction, and has a valve seat secured to the higher sidewall of the spacer 17 circumjacent a bore provided therethrough for receiving the exit conduit 29. Heated air passes from the passageway to the atmosphere outside the container 10 when there is no obstruction of the central opening in the annular valve seat of the exit valve 26.

The valve stem 32 of the entry valve 25 is configured as a poppet, i.e., as a valve closure device, having a plug portion 35 and a shaft portion 36. The plug portion 35 causes closure of the bore 34 when the valve stem 32 is seated in the valve seat 31. When the valve stem 32 is moved away from the valve seat 31, ambient air from outside the container 10 can enter via the bore 34 into the passageway between the bed of desiccant material 14 and the transparent cover 15. The exit valve 26 has a similarly configured valve stem, which functions in like manner to open and close a pathway for heated air from the passageway between the bed of desiccant material 14 and the transparent cover 15 to the atmosphere outside the container 10.

The spring 33 of the entry valve 25 has a conical base portion that is secured as by brazing to the annular valve seat 31, and a conical apex portion that is secured as by brazing to the shaft portion 36 of the valve stem 30. The helical pitch of the spring 33 is selected so that the plug portion 35 of the valve stem 32 is seated in the valve seat 31 when the temperature of the air in the passageway between the bed of desiccant material 14 and the transparent cover 15 is the same as the temperature of the ambient air outside the container 10. The spring 33 is made of two different metals. As the temperature of solar heated air in the passageway increases relative to the temperature of the ambient air outside the container 10, differential thermal expansion of the different metals causes mechanical stretching or elongation of the spring 33. As this temperature difference increases beyond a pre-set value, the elongation of the spring 33 causes the plug portion 35 of the valve stem 32 to be lifted away from the valve seat 31. Conversely, as the temperature difference decreases below th pre-set value, a concomitant shortening of the spring 33 returns the plug portion 35 of the valve stem 32 to the valve seat 31. In this way, opening or closing of the entry valve 25 can be effected whenever the temperature difference between the bed of desiccant material 14 and the transparent cover 15 exceeds or falls below a preset value. In like manner, opening and closing of the exit valve 26 can be effected synchronously with the opening and closing of the entry valve 25.

In operation of the humidity controller 12 of the present invention, moisture is removed from the interior of the storage container 10 by being adsorbed onto the desiccant material contained in the bed of desiccant material 14. Solar energy incident upon the transparent cover 15 is transmitted through the cover 15 into the passageway between the bed of desiccant material 14 and the cover 15, thereby heating the air in the passageway and also heating an outwardly facing surface of the bed of desiccant material 14 exposed to the heated air in the passageway. As solar heating continues, eventually enough energy is absorbed by moisture on the outwardly facing surface of the bed of desiccant material 14 to vaporize the moisture. The vaporized moisture mixes in vapor phase with the heated air in the passageway, leaving a concentration gradient for liquid-phase moisture in the bed of desiccant material 14. Continued solar heating further raises the temperature of the air in the passageway, thereby further increasing the moisture carrying ability of the air in the passageway.

The concentration gradient for liquid-phase moisture in the bed of desiccant material 14 causes moisture to migrate through the bed toward the outwardly facing surface thereof, whereupon the moisture is evaporated into the heated air in the passageway. Continued heating of the moisture-laden air in the passageway with the entry valve 25 and the exit valve 26 open reduces the density of the heated air in the passageway, and thereby generates a natural convection current of cooler ambient air into the passagway via the entry valve 25 and of heated moisture-laden air out of the passageway via the exit valve 26. The bed of desiccant material 14 can thereby be regenerated continuously, as long as the temperature of the air in the passageway is greater than the temperature of the ambient air outside the container 10. Whenever the source of solar energy is obscured, e.g., at night or during periods of cloudiness, the temperature difference between the air in the passageway and the ambient air outside the container 10 tends to fall below the preselected value for keeping the entry valve 25 and the exit valve 26 open. The valves 25 and 26 then close, thereby preventing ambient air from entering the passageway and introducing moisture from outside the container 10 into the bed of desiccant material 14.

In the preferred embodiment of the invention, a protective lid 37 is hingedly attached to the retainer 18 of the frame assembly 13 by conventional means such as a piano hinge 38. The protective lid 37 is movable through an angular range (ordinarily 90 degrees) from a closed position overlying the transparent cover 15 to an open position, which as shown in FIGS. 2 and 3 is perpendicular to the transparent cover 15. An inner surface portion 39 of the lid 37 is lined or coated with a reflective material, e.g., silvered glass or anodized aluminum, to reflect solar energy incident thereon toward the transparent cover 15. In this way, the flux of solar energy transmitted directly through the transparent cover 15 is augmented by the flux of reflected solar energy, thereby increasing the efficiency of the humidity controller 12 in regenerating the bed of desiccant material 14. A mechanical stop device 40 attached to the lid 37 limits the angular separation between the lid 37 and the transparent cover 15. In particular applications, the stop device 40 can be adjustable so that the lid 37 in open position can be oriented at a selected angle to maximize the reflected solar enery flux incident upon the transparent cover 15. A gasket 41 may be secured around the interior periphery of the lid 37 to make contact with the retainer 18 when the lid 37 is in closed position.

This invention has been described above in terms of a particular embodiment designed for use in particular applications. However, other embodiments and applications would be apparent to workers skilled in the art upon perusal of the above description and the accompanying drawing. Therefore, the above description is to be considered as illustrative of the invention, while the legal definition of the invention is provided more generally by the following claims and their equivalents.

We claim:

1. A humidity controller for installation in an apertured portion of a wall of a storage container, said humidity controller comprising:

(a) a frame assembly insertable into said apertured portion of said wall, said frame assembly being securable to said wall;

(b) a bed of solid desiccant material for removing moisture from said container, said bed of desiccant material being positioned by said frame assembly inside said container when said frame assembly is inserted into said apertured portion of said wall;

(c) a cover that is substantially transparent to solar energy, said transparent cover being positioned by said frame assembly apart from said bed of desiccant material and overlying said apertured portion of said wall when said frame assembly is inserted into said apertured portion of said wall, a passageway thereby being formed between said transparent cover and said bed of desiccant material, air in said passageway and a surface portion of said bed of desiccant material exposed to said air in said passageway being heated by solar energy transmitted through said transparent cover, heating of said surface portion of said bed of desiccant material causing moisture to pass from said bed of desiccant material into said passageway, said heated air in said passageway thereby becoming moisture-laden; and (d) valve means attached to said frame assembly for enabling removal of said moisture-laden heated air from said passageway by convection.

2. The humidity controller of claim 1 wherein said valve means comprises an inlet valve and an outlet valve, said inlet valve being attached to said frame assembly at a lower position than said outlet valve, said inlet valve permitting ambient air from outside said container to enter said passageway when said ambient air is cooler than said heated air in said passageway, said outlet valve permitting said heated air to leave said passageway.

3. The humidity controller of claim 2 wherein said inlet and outlet valves are bimetallic valves that open and close in response to changes in temperature, said inlet and outlet valves being pre-set to open when a predetermined temperature difference occurs between said heated air in said passageway and said ambient air.

4. The humidity controller of claim 1 wherein said bed of desiccant material is generally planar, said frame assembly positioning said bed of desiccant material generally vertically inside said container.

5. The humidity controller of claim 4 wherein said desiccant material is contained within a fabric that is pervious to moisture, said frame assembly positioning said bed of desiccant material adjacent said apertured portion of said wall of said container.

6. The humidity controller of claim 1 wherein said desiccant material comprises silica gel, which removes moisture from said container by adsorption.

7. The humidity controller of claim 1 wherein said transparent cover is made of glass.

8. The humidity controller of claim 1 further comprising a protective lid hingedly attached to said frame assembly, an inner surface of said lid being reflective of solar energy, said lid being movable from a closed position overlying said transparent cover to an open position at which solar energy can be reflected from said reflective inner surface onto said transparent cover.

9. A storage facility comprising an enclosed container, a wall of said container having an apertured portion, a frame assembly secured in said apertured portion of said container wall, a bed of solid desiccant material supported inside said container by said frame assembly, a cover that is substantially transparent to solar energy, said transparent cover being supported by said frame assembly so as to overlie said apertured portion of said container wall, said transparent cover being spaced apart from said bed of desiccant material to form a passageway between said transparent cover and said bed of desiccant material, air in said passageway and a surface portion of said bed of desiccant material exposed to said air in said passageway being heated by solar energy transmitted through said transparent cover to cause moisture to pass from said bed of desiccant material into said passageway, heated air in said passageway thereby becoming moisture-laden, and valve means secured to said frame assembly for removal of moisture-laden air from said passageway by convection.

10. The storage facility of claim 9 wherein said valve means comprises an inlet valve for entry of ambient air from outside said container into said passageway when said ambient air is cooler than said air in said passageway, and an exit valve for exit of heated air from said passageway by natural convection.

11. The storage facility of claim 10 wherein said inlet and exit valves are bimetallic valves that open and close in response to changes in temperature, said valves being pre-set to open when a predetermined temperature difference occurs between said heated air in said passageway and said ambient air.

12. The storage facility of claim 9 wherein said bed of desiccant material is generally planar, said bed of desiccant material being supported inside said container in a vertical orientation generally parallel to said container wall.

13. The storage facility of claim 12 wherein said desiccant material is contained within a fabric that is pervious to moisture.

14. The storage facility of claim 13 wherein said desiccant material consists of silica gel.

15. The storage facility of claim 9 wherein said transparent cover is made of glass.

16. The storage facility of claim 9 further comprising a protective lid hingedly attached to said frame assembly, an inner surface of said lid being reflective of solar energy, said lid being movable from a closed position overlying said transparent cover to an open position at which solar energy can be reflected from said reflective inner surface onto said transparent cover.

* * * * *